2,985,658
Patented May 23, 1961

2,985,658
PREPARATION OF DIAZABICYCLO-OCTANE FROM N-AMINOETHYL PIPERAZINE

Jack H. Krause, Media, Pa., assignor to Houdry Process Corporation, Wilmington, Del., a corporation of Delaware No Drawing. Filed Aug. 19, 1958, Ser. No. 755,881

3 Claims. (Cl. 260—268)

The present invention relates to the preperation of triethylene diamine, also known as diazabicyclo (2.2.2) octane, and involves a novel process for the synthesis of this compound in practical yields from readily available and comparatively inexpensive raw materials.

Diazabicyclo-octane has been successfully employed to an increasing extent as a catalyst for base-catalyzed reactions, particularly in the preparation of polyurethane foams. While this compound had been reported in the literature considerably earlier, the first production thereof in commercial quantities was achieved only in recent years by processes involving vapor phase reaction of certain alkylene polyamines over solid acidic catalyst. With increasing demand for the compound attention has been directed to improved methods of production to obtain increased yields of product, improved reaction selectivity, and/or lower production costs.

It has now been found that diazabicyclo-octane can be produced directly by the deamination with further ring formation of N-aminoethyl piperazine in vapor phase over suitable solid acidic catalyst, as illustrated below.

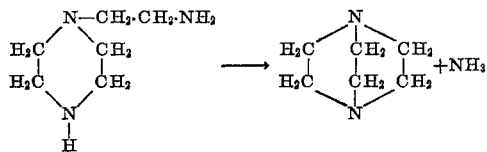

N-aminoethyl piperazine is available on the commercial market in desired quantities as a by-product formed in the synthesis of alkylene polyamines.

Previous attempts to obtain diazabicyclo-octane by ring closure of a β-substituted N-ethyl piperazine had been wholly unsuccessful or obtained yields of no more than about one to several percent. After a number of unsuccessful attempts Hromatka [Berichte 75B, 1302 (1942)] reported the production of diazabycyclo-octane in fair yields by carefully controlled heating of N-beta bromoethyl piperazine hydrobromide; smaller yields were obtained from the corresponding hydrochloride, while the corresponding N-hydroxyethyl compound gave considerably poorer yields. Attempts made in our laboratories to obtain diazabicyclo-octane by thermal dehydrohalogenation of N-aminoethyl piperazine hydrohalide employing conventional ring closure techniques were not successful.

In accordance with the present invention consistently good yields of diazabicyclo-octane are obtained by passing N-aminoethyl piperazine over solid acidic catalyst at temperatures in the range of about 400–750° F., preferably over siliceous cracking catalyst of moderate to high activity at temperatures of 650 to 700° F.

Example

N-aminoethyl piperazine was vaporized and passed over a commercial silica-alumina catalyst for two hours at a space rate of 1.1 volumes of the piperazine compound per hour (determined as liquid) per volume of catalyst, during which period the temperature varied between 670 to 725° F. There was obtained 81% by weight of a liquid product which contained by volume 29.7% diazabicyclo-octane, 8% piperazine and 10.4% of unreacted N-aminoethyl piperazine, or about 35% yield of diazabicyclo-octane based on N-aminoethyl piperazine reacted.

The catalyst used in the above run consisted of 4 mm. cylindrical gel pellets comprising 86% $SiO_2$–12% $Al_2O_3$ having a surface area of 375 m.$^2$/g. Tested under standard "CAT–A" conditions (J. Alexander and H. G. Shimp, page 537, National Petroleum News, Technical Section, August 2, 1944) this catalyst obtains over 65% conversion of the standard gas oil under the test conditions (800° F. and 1.5 space rate v./hr./v.).

Other siliceous cracking catalysts that may be employed under substantially similar conditions, but not necessarily with equal results, include in addition to gels of the silica-alumina type, such siliceous gels containing zirconia or magnesia substituting all or part of the alumina; or acid-activated clays. The moderately active siliceous cracking catalyst are those generally having a surface area of at least 80 m.$^2$/g.; the preferred silica-alumina catalysts are those having a surface area of at least 180 m.$^2$/g. Other acidic solid catalysts that can be employed include alumina of at least 80 m.$^2$/g. surface area and containing incorporated fluoride or phosphate ion. In general, the higher the activity of the catalyst the lower is the reaction temperature to be employed for best results.

Recovery of the diazabicyclo-octane from the reaction mixture is obtained by fractional distillation to separate a cut in the approximate boiling range of the desired compound (about 165 to 175° C.) which on cooling or redistillation and sublimation separates out crystals of diazabicyclo-octane of acceptable purity. By known techniques further recovery of crystalline product can be obtained from the mother liquor. If desired, recovery of the diazabicyclo-octane from the reaction effluent can be obtained by the method set out in copending application, Serial No. 628,723, filed December 17, 1956 now Patent No. 2,937,176. In accordance with the method therein described, a cut rich in diazabicyclo-octane is fractionated from a reaction effluent and is triturated with a normally liquid low boiling aliphatic hydrocarbon, such as N-pentane and cooled, whereupon the desired diazabicyclo-octane crystallizes out as a product of fairly high purity. By then distilling off the aliphatic hydrocarbon from the mother liquor further crystalline product is obtained as well as a mushy second mother liquor filtered therefrom. The latter can be retreated with light hydrocarbons as before for recovery of further quantities of solid product.

The preferred method for recovery of diazabicyclo-octane is that described in copending application, Serial No. 734,094, filed May 9, 1958. As therein described, the initial reaction effluent, containing the diazabicyclo-octane in admixture with other N-heterocyclic compounds and aliphatic amines, is distilled with the addition of a stable water-insoluble organic compound boiling in the range of 135–180° C., such as xylene, and the cut rich in diazabicyclo-octane collected. By this method more complete separation and recovery of the piperazine by-product is had, enabling more easy recovery of the higher boiling diazabicyclo-octane. By cooling of the cut rich in diazabicyclo-octane to about room temperature, an initial batch of crystals of this compound is recovered in high yield. Further recovery of desired solids from the residual mother liquor can be obtained by redistillation or other known crystallization techniques.

Regardless of the method employed for recovery of the desired diazabicyclo-octane from the reaction mixture, the fraction containing unreacted N-aminoethyl piperazine can be recycled, with or without other desirable components, for further reaction over the catalyst.

Obviously many modifications and variations of the invention as hereinbefore set forth may be made without departing from the spirit and scope thereof, and therefore only such limitations should be imposed as are indicated in the appended claims.

I claim:

1. The method of preparing diazabicyclo-octane which comprises passing N-aminoethyl piperazine in vapor state over solid acidic silica-alumina catalyst at a temperature in the range of 400–750° F.

2. The method according to claim 1 wherein the reaction temperature is in the approximate range of 650 to 700° F.

3. The method according to claim 1 wherein said catalyst is one having a surface area of at least 180 m.$^2$/g.

References Cited in the file of this patent
UNITED STATES PATENTS 2,267,686    Kyrides _____ Dec. 23, 1941